US009473725B2

(12) United States Patent
Ono

(10) Patent No.: US 9,473,725 B2
(45) Date of Patent: Oct. 18, 2016

(54) IMAGE-PROCESSING AND ENCODED APERTURE PATTERN SETTING DEVICE AND METHOD, AND IMAGE PICKUP DEVICE COMPRISING SAME

(71) Applicant: FUJIFILM Corporation, Tokyo (JP)

(72) Inventor: Shuji Ono, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 3 days.

(21) Appl. No.: 14/667,995

(22) Filed: Mar. 25, 2015

(65) Prior Publication Data

US 2015/0201143 A1 Jul. 16, 2015

Related U.S. Application Data

(63) Continuation of application No. PCT/JP2013/075307, filed on Sep. 19, 2013.

(30) Foreign Application Priority Data

Sep. 25, 2012 (JP) .................................. 2012-210960

(51) Int. Cl.
| | |
|---|---|
| *H04N 5/378* | (2011.01) |
| *G02B 27/00* | (2006.01) |
| *H04N 5/225* | (2006.01) |
| *H04N 5/232* | (2006.01) |
| *G02B 3/00* | (2006.01) |
| *G02B 15/00* | (2006.01) |
| *G02B 7/34* | (2006.01) |

(52) U.S. Cl.
CPC .......... *H04N 5/378* (2013.01); *G02B 27/0075* (2013.01); *H04N 5/2254* (2013.01); *G02B 3/00* (2013.01); *G02B 7/346* (2013.01); *G02B 15/00* (2013.01); *H04N 5/225* (2013.01); *H04N 5/232* (2013.01); *H04N 5/23229* (2013.01)

(58) Field of Classification Search
CPC .............. H04N 5/378; H04N 5/2254; H04N 5/23229; H04N 5/232; H04N 5/225; G02B 3/00; G02B 15/00
See application file for complete search history.

(56) References Cited

U.S. PATENT DOCUMENTS

| | | | |
|---|---|---|---|
| 8,811,769 B1 * | 8/2014 | Pitts ......................... | G06T 3/40 382/275 |
| 2009/0140131 A1 * | 6/2009 | Utagawa .............. | G02B 3/0056 250/226 |

(Continued)

FOREIGN PATENT DOCUMENTS

| | | |
|---|---|---|
| JP | 2007-004471 | 1/2007 |
| JP | 2011-166255 | 8/2011 |
| JP | 2011-530848 | 12/2011 |

OTHER PUBLICATIONS

International Search Report, PCT/JP2013/075307, Nov. 19, 2013.

(Continued)

*Primary Examiner* — Abdelaaziz Tissire
(74) *Attorney, Agent, or Firm* — Young & Thompson

(57) ABSTRACT

An image-processing device includes an image acquiring device, an encoded aperture pattern setting device configured to set encoded aperture patterns for multiple pupil images of the main lens, respectively, a calculation device configured to perform a weighted product-sum calculation between the pupil image for each lens of the lens array in the image acquired from the image sensor and the encoded aperture pattern set by the encoded aperture pattern setting device, and an image generating device configured to generate an image based on a calculation result by the calculation device.

10 Claims, 11 Drawing Sheets

(56) References Cited

U.S. PATENT DOCUMENTS

| | | | |
|---|---|---|---|
| 2009/0273843 A1* | 11/2009 | Raskar | G02B 27/0018 359/601 |
| 2011/0129054 A1 | 6/2011 | De Villiers et al. | |
| 2012/0154651 A1 | 6/2012 | Ohno | |
| 2012/0226480 A1* | 9/2012 | Berkner | G01J 1/0492 703/1 |

OTHER PUBLICATIONS

Written Opinion, PCT/JP2013/ 075307, Nov. 19, 2013.

Veeraraghavan A. et al., "Dappled Photography: Mask Enhanced Cameras for Heterodyned Light Fields and Coded Aperture Refocusing", ACM Transactions on Graphics, vol. 26, No. 3, Article 69, Jul. 2007.

Extended European Search Report (EESR) dated Apr. 13, 2016; Application No. 13841002.2.

* cited by examiner

IMAGE-PROCESSING AND ENCODED APERTURE PATTERN SETTING DEVICE AND METHOD, AND IMAGE PICKUP DEVICE COMPRISING SAME

CROSS-REFERENCE TO RELATED APPLICATIONS

This application is a Continuation of PCT International Application No. PCT/JP2013/075307 filed on Sep. 19, 2013, which claims priority under 35 U.S.C §119(a) to Japanese Patent Application No. 2012-210960 filed on Sep. 25, 2012. Each of the above application(s) is hereby expressly incorporated by reference, in its entirety, into the present application.

BACKGROUND OF THE INVENTION

1. Field of the Invention

The present invention relates to an image-processing device and method, and an image pickup device, and particularly relates to a technology of acquiring an image equivalent to an image to be taken with an encoded aperture inserted in a lens pupil position.

2. Description of the Related Art

In the technical field of image pickup devices, there is known a technology of acquiring an image by multiple PSFs (Point Spread Functions; point image distribution functions) and then from the acquired image, performing processes such as the correction of a blur and the distance estimation for an object. On that occasion, in order to enhance the robustness of the restoration and estimation processes, an encoded aperture (encoded pupil) is used (hereinafter, such an image taking with use of the encoded aperture is referred to as an "encoded aperture image taking"). For example, there is known a technology of changing the PSF by interchanging lenses in which encoded apertures having different patterns are incorporated, and then acquiring multiple images with a single image pickup device.

Japanese Patent Application Laid-Open No. 2011-166255 (hereinafter referred to as PTL 1) describes an image pickup device that includes an aperture having a circular external shape and having an interior divided into concentric sector shapes, and that includes an aperture array allowing an encoded aperture in an arbitrary pattern (combination) to be set.

Further, National Publication of International Patent Application No. 2011-530848 (hereinafter referred to as PTL 2) describes a method of providing an image having a high resolution, by using different encoded aperture arrays for the respective frames and using, for many obtained frames, individual decode patterns corresponding to the encoded aperture arrays used for obtaining the frames.

SUMMARY OF THE INVENTION

Both of the inventions described in PTLs 1 and 2 perform the image taking with the encoded aperture array inserted on an optical path in the image-taking optical system. Therefore, for acquiring multiple images by using different encoded aperture arrays, it is necessary to perform the image taking multiple times while switching among the different encoded aperture arrays. In this case, there is a problem in that only a stationary object can be taken because of the gap in the timing of the multiple-time image taking. Further, there is a problem in that a device for switching the encoded aperture array has a large and complex configuration and raises the cost.

The present invention, which has been made in view of such circumstances, has an object to provide an image-processing device and method and an image pickup device that make it possible to virtually acquire an image equivalent to an image to be taken with an encoded aperture inserted in a lens pupil position, and thereby facilitate the selection and interchange of the encoded aperture pattern, that make it possible to apply multiple encoded apertures simply by a one-time image taking, and that make it possible to use an advanced encoded aperture image-taking method even for a moving object and a moving image.

For achieving the above object, an image-processing device according to an aspect of the present invention includes: an image acquiring device configured to acquire an image from an imaging device, the imaging device including a main lens, an image sensor and a lens array, the image sensor including multiple pixels, the multiple pixels being configured by photoelectric conversion elements that are arrayed in a two-dimensional form, the lens array being arranged on an incident plane side of the image sensor, the lens array forming pupil images of the main lens on a light receiving surface of the image sensor, with respective lenses of the lens array, by an amount equal to the number of the lenses of the lens array; an encoded aperture pattern setting device configured to set encoded aperture patterns for the multiple pupil images of the main lens, respectively; a calculation device configured to perform a weighted product-sum calculation between the pupil image for each lens of the lens array in the image acquired from the image sensor and the encoded aperture pattern set by the encoded aperture pattern setting device; and an image generating device configured to generate an image based on a calculation result by the calculation device.

According to the present invention, by performing the weighted product-sum calculation between the pupil image of the main lens and the encoded aperture pattern, it is possible to obtain an image equivalent to an image to be taken with the encoded aperture inserted in a lens pupil position (pupil plane). This facilitates the selection and interchange of the encoded aperture pattern, and makes it possible to obtain images in which multiple encoded apertures have been applied, simply by a one-time image taking. Further, it is possible to use an advanced encoded aperture image-taking method, even for a moving object and a moving image.

An image-processing device according to another mode of the present invention includes: an image acquiring device configured to acquire an image from an imaging device, the imaging device including a main lens, an image sensor and a lens array, the image sensor including multiple pixels, the multiple pixels being configured by photoelectric conversion elements that are arrayed in a two-dimensional form, the lens array being arranged on an incident plane side of the image sensor, the lens array reforming a picture formed by the main lens, on a light receiving surface of the image sensor; a pixel collecting device configured to collect pixels corresponding to an identical position in an object image, from a partial image for each lens of the lens array, the partial image being in an encoded aperture pattern for a pupil image of the main lens and being in the image acquired from the image sensor; an encoded aperture pattern setting device configured to set the encoded aperture pattern for the pupil image of the main lens; a calculation device configured to perform a weighted product-sum calculation between a pixel group collected by the pixel collecting device and the encoded aperture pattern set by the encoded aperture pattern setting device; and an image generating device configured to generate an image based on a calculation result by the calculation device.

According to the present invention, for the pixels corresponding to the identical position in the partial image to be obtained for each lens of the lens array, the weighted product-sum calculation corresponding to the encoded aperture pattern is performed. Thereby, it is possible to obtain an image equivalent to an image to be taken with the encoded aperture inserted in a lens pupil position (pupil plane). This facilitates the selection and interchange of the encoded aperture pattern, and makes it possible to obtain an image in which multiple encoded apertures have been applied, simply by a one-time image taking. Further, it is possible to use an advanced encoded aperture image-taking method, even for a moving object and a moving image.

The present invention can adopt a mode in which the encoded aperture pattern setting device comprises a storage device configured to store multiple types of encoded aperture patterns, and a selection device configured to select a single encoded aperture pattern from the storage device, and sets the encoded aperture pattern selected by the selection device. Thereby, it is possible to easily alter the encoded aperture pattern.

The present invention can adopt a mode in which the encoded aperture pattern setting device comprises a designation device configured to designate a weight coefficient for each position in a two-dimensional filter that has a weight coefficient corresponding to the encoded aperture pattern, and sets an arbitrary encoded aperture pattern based on the designation by the designation device. Thereby, a user can freely alter the weight coefficient.

The present invention can adopt a mode in which the encoded aperture pattern setting device sets a different encoded aperture pattern to the pupil image for each lens of the lens array. It is possible to change the effect of the encoded aperture for each position in the object image.

The present invention can adopt a mode in which the encoded aperture pattern setting device sets a different encoded aperture pattern for each pixel group collected by the pixel collecting device. It is possible to change the effect of the encoded aperture for each position in the object image.

It is preferable that the present invention be included in an image pickup device.

An image-processing method according to a mode of the present invention includes: an image acquiring step for acquiring an image from an imaging device, the imaging device including a main lens, an image sensor and a lens array, the image sensor including multiple pixels, the multiple pixels being configured by photoelectric conversion elements that are arrayed in a two-dimensional form, the lens array being arranged on an incident plane side of the image sensor, the lens array forming pupil images of the main lens on a light receiving surface of the image sensor, with respective lenses of the lens array, by an amount equal to the number of the lenses of the lens array; an encoded aperture pattern setting step for setting encoded aperture patterns for the pupil images of the main lens, respectively; a calculation step for performing a weighted product-sum calculation between the pupil image for each lens of the lens array in the image acquired from the image sensor and the encoded aperture pattern set by the encoded aperture pattern setting step; and an image generating step for generating an image based on a calculation result by the calculation step.

According to the present invention, by performing the weighted product-sum calculation between the pupil image of the main lens and the encoded aperture pattern, it is possible to obtain an image equivalent to an image to be taken with the encoded aperture inserted in a lens pupil position (pupil plane). This facilitates the selection and interchange of the encoded aperture pattern, and makes it possible to obtain an image in which multiple encoded apertures have been applied, simply by a one-time image taking. Further, it is possible to use an advanced encoded aperture image-taking method, even for a moving object and a moving image.

An image-processing method according to another mode of the present invention includes: an image acquiring step for acquiring an image from an imaging device, the imaging device including a main lens, an image sensor and a lens array, the image sensor including multiple pixels, the multiple pixels being configured by photoelectric conversion elements that are arrayed in a two-dimensional form, the lens array being arranged on an incident plane side of the image sensor, the lens array reforming a picture formed by the main lens, on a light receiving surface of the image sensor; a pixel collecting step for collecting pixels corresponding to an identical position in an object image, from a partial image for each lens of the lens array, the partial image being in an encoded aperture pattern for a pupil image of the main lens and being in the image acquired from the image sensor; an encoded aperture pattern setting step for setting the encoded aperture pattern for the pupil image of the main lens; a calculation step for performing a weighted product-sum calculation between a pixel group collected by the pixel collecting step and the encoded aperture pattern set by the encoded aperture pattern setting step; and an image generating step for generating an image based on a calculation result by the calculation step.

According to the present invention, for the pixels corresponding to the identical position in the partial image to be obtained for each lens of the lens array, the weighted product-sum calculation corresponding to the encoded aperture pattern is performed. Thereby, it is possible to obtain an image equivalent to an image to be taken with the encoded aperture inserted in a lens pupil position (pupil plane). This facilitates the selection and interchange of the encoded aperture pattern, and makes it possible to obtain an image in which multiple encoded apertures have been applied, simply by a one-time image taking. Further, it is possible to use an advanced encoded aperture image-taking method, even for a moving object and a moving image.

The present invention can adopt a mode in which a step for altering a setting of the encoded aperture pattern in the encoded aperture pattern setting step is included, the calculation step executes the weighted product-sum calculation using an altered encoded aperture pattern, for a single image acquired by the image acquiring step, whenever the encoded aperture pattern is altered by the encoded aperture pattern setting step, and the image generating step generates the image based on the calculation result by the calculation step, whenever the encoded aperture pattern is altered by the encoded aperture pattern setting step.

According to the present invention, it is possible to virtually acquire an image equivalent to an image to be taken with an encoded aperture inserted in a lens pupil position. This facilitates the selection and interchange of the encoded aperture pattern, makes it possible to apply multiple encoded apertures simply by a one-time image taking, and makes it possible to use an advanced encoded aperture image-taking method, even for a moving object and a moving image.

DETAILED DESCRIPTION OF THE PREFERRED EMBODIMENTS

Hereinafter, embodiments of image pickup devices according to the present invention are described with reference to the accompanying drawings.

Figure 1:
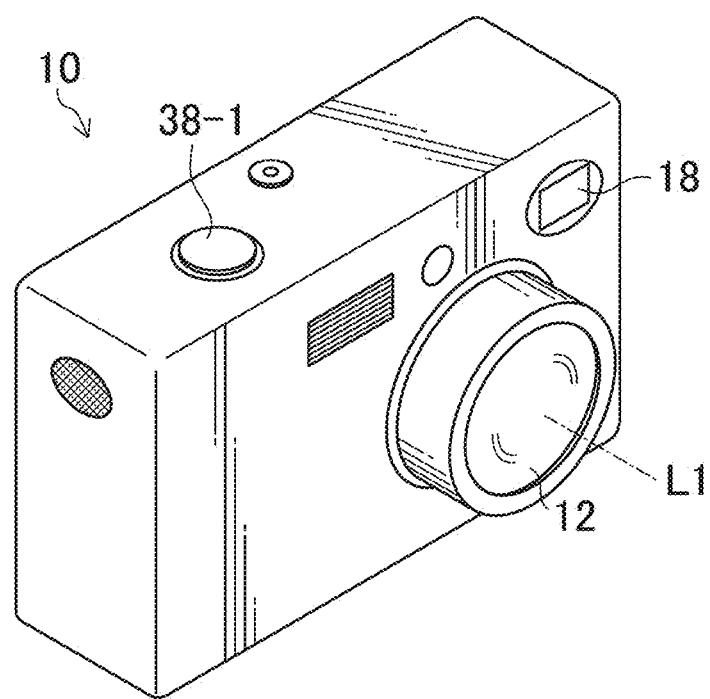
FIG. 1 is an appearance perspective view of an image pickup device according to a first embodiment of the present invention.

FIG. 1 is an appearance perspective view of an image pickup device 10 (image pickup device) according to a first embodiment of the present invention. As shown in FIG. 1, an image-taking lens (main lens) 12, a strobe 18 and the like are disposed on the anterior surface of the image pickup device 10, and a shutter button 38-1 is provided on the top surface. Reference character L1 designates an optical axis of the main lens 12.

Figure 2:
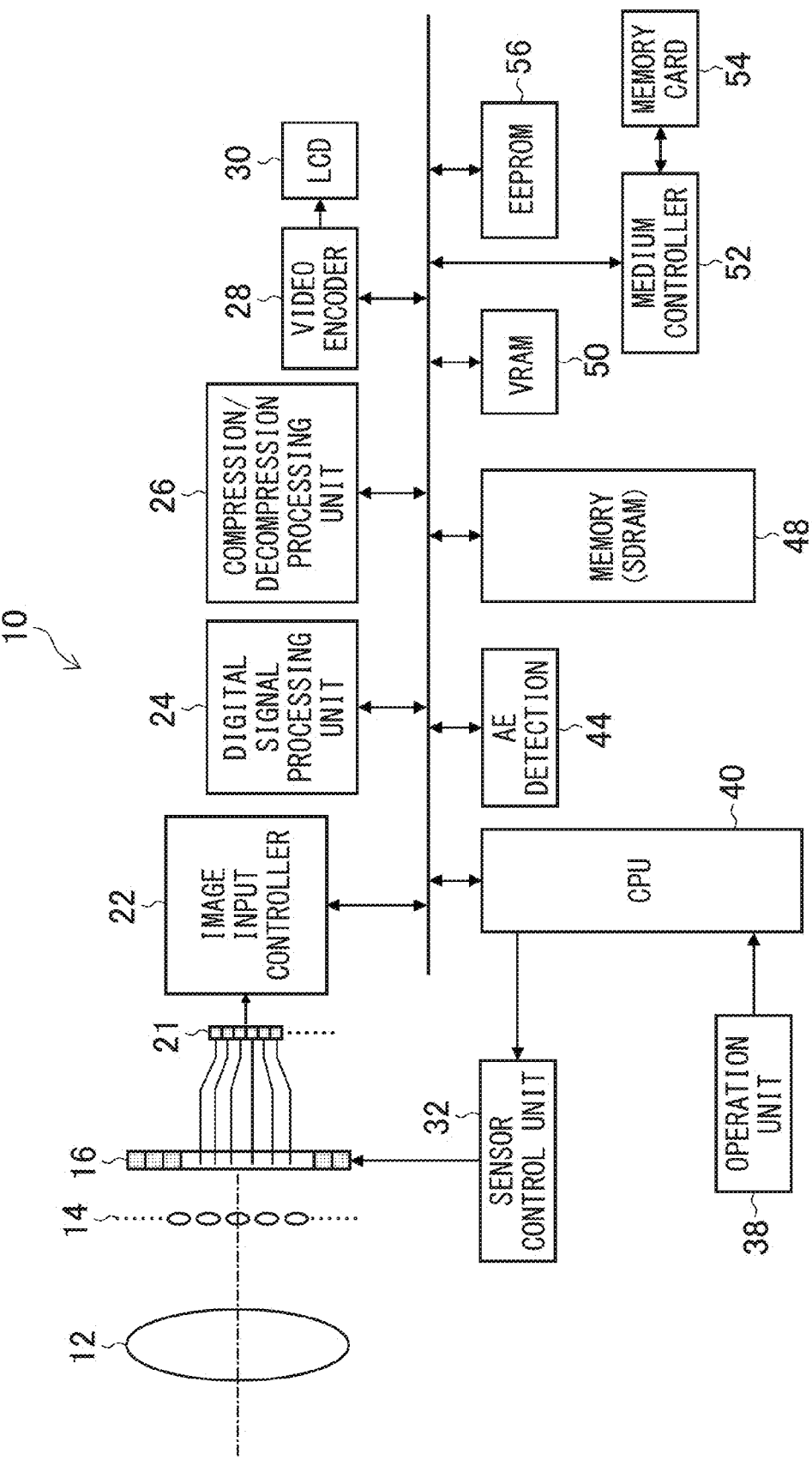
FIG. 2 is a block diagram showing an embodiment of the internal configuration of the image pickup device shown in FIG. 1.

FIG. 2 is a block diagram showing an embodiment of the internal configuration of the image pickup device 10.

The image pickup device 10, which records a picked-up image in a memory card 54, is provided with a micro-lens array 14 between the main lens 12 and a CMOS type imaging element (image sensor) 16, and includes an image-taking optical system of a so-called plenoptic camera. The overall operation of the device is integrally controlled by a central processing unit (CPU) 40.

The image pickup device 10 is provided with an operation unit 38 including the shutter button 38-1, a mode dial, a playback button, a MENU/OK key, a cross key, a BACK key and the like. A signal from the operation unit 38 is input to the CPU 40. Based on the input signal, the CPU 40 controls each circuit of the image pickup device 10, and for example, performs the image-taking operation control, the image-processing control, the recording/playing control of image data, the display control of a liquid crystal monitor (LCD) 30, and the like.

The shutter button 38-1 (FIG. 1) is an operation button for inputting the instruction of the start of image taking, and is configured as a two-step stroke type switch including an S1 switch that is turned on at the time of a half-push, and an S2 switch that is turned on at the time of a fill-push. The mode dial is a selection device configured to selecting either of an automatic image-taking mode for taking a still image, a manual image-taking mode, a scene position for a person, a landscape, a nightscape or the like, and a moving image mode for taking a moving image.

The playback button is a button for the switching to a playback mode, in which a taken and recorded still image or moving image is displayed on the liquid crystal monitor 30. The MENU/OK key is an operation key having both of a function as a menu button for commanding the display of a menu on the screen of the liquid crystal monitor 30 and a function as an OK button for commanding the decision and execution of a selected content, or the like. The cross key is an operation unit for inputting instructions for four directions: the upward direction, the downward direction, the leftward direction and the rightward direction, and functions as a button (cursor-movement operation device) for selecting an item from a menu screen, and for giving instructions of selections of various setting items from each menu. Further, the upward/downward key of the cross key functions as a zoom switch at the time of image taking, or a playback zoom switch at the time of the playback mode, and the leftward/rightward key functions as a frame advance (forward directional/backward directional advance) button at the time of the playback mode. The BACK key is used for the deletion of an intended object such as a selected item, the cancel of an instruction content, the restoration to the last operation state, or the like.

In the image-taking mode, object light goes through the main lens 12 and the micro-lens array 14, and forms an image on a light receiving surface of the CMOS type imaging element (image sensor) 16.

Figure 3:
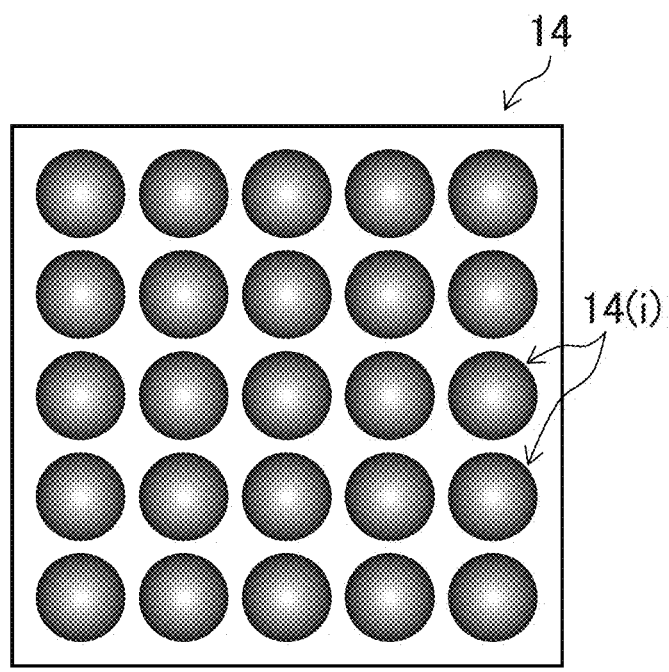
FIG. 3 is an image diagram of a part of a micro-lens array shown in FIG. 1, as viewed from the front.

As shown in an image diagram of FIG. 3, in which a part is extracted and shown from the front, the micro-lens array 14 includes many micro-lenses 14($i$) (i is a different number assigned to each micro-lens) having a predetermined focal distance.

In the image sensor 16, many light receiving cells (light receiving elements) are arrayed in a two-dimensional form, and an object image formed on the light receiving surface of each light receiving cell is converted into a signal voltage (or an electric charge) having a quantity corresponding to the incident light quantity. Here, in the image sensor 16, color filters of red (R), green (G) and blue (B) are arranged for each light receiving cell.

The signal voltage (or the electric charge) accumulated in the image sensor 16 is stored in the light receiving cell itself or an attached capacitor. The stored signal voltage (or the electric charge) is read at the same time as the selection of a pixel position, by a sensor control unit 32, using the technique of a MOS (Metal Oxide Semiconductor) type imaging element (a so-called CMOS sensor) that uses an X-Y address scheme. Thereby, it is possible to read the signal voltage for each pixel, from the image sensor 16.

As for the imaging signal (voltage signal) read from the image sensor 16, the sampling hold of R, G and B signals for each pixel is performed by a correlated double sampling process (a process of obtaining accurate pixel data by calculating the difference between the feedthrough component level and pixel signal component level included in the output signal for each one pixel of the image sensor, for the purpose of the reduction in the noise (particularly, thermal noise) and the like included in the output signal of the image sensor), and after the amplification, they are given to an A/D converter 21. The A/D converter 21 sequentially converts the input R, G and B signals into R, G and B digital signals, and outputs them to an image input controller 22. Here, some of MOS type image sensors have an A/D converter built-in. In this case, the R, G and B digital signals are output directly from the image sensor 16.

The image input controller 22 can acquire the pixel data from the image sensor 16 by selecting the pixel position and reading the image data. However, in the embodiment, all the pixel data are read from the image sensor 16, and are temporarily stored in a memory (SDRAM: Synchronous Dynamic Random Access Memory) 48.

The digital signal processing unit 24 reads image data composed of the pixel data stored in the memory 48, through the image input controller 22, and performs predetermined signal processes such as an offset process, a gain control process including a white balance correction and a sensitivity correction, a gamma correction process and a YC process. Further, the digital signal processing unit 24 performs an encoded aperture process described later.

The image data processed in the digital signal processing unit 24 are input to a VRAM (Video Random Access Memory) 50. The image data read from the VRAM 50 are encoded in a video encoder 28, and are output to the liquid crystal monitor 30, which is provided on the back surface of the camera. Thereby, the object image is displayed on the display screen of the liquid crystal monitor 30.

When the first-step push (half-push) of the shutter button 38-1 of the operation unit 38 is performed, the CPU 40 starts an AE (Automatic Exposure) operation, and the image data output from the A/D converter 21 are taken in an AE detection unit 44.

The AE detection unit 44 integrates the G signals in the whole screen, or integrates the G signals that are weighted differently between the central part and edge part of the screen, and outputs the integrated value to the CPU 40. The CPU 40 calculates the brightness (image-taking Ev value) of the object, from the integrated value input by the AE detection unit 44, determines the diaphragm value of a diaphragm (not shown in the figure) and an electronic shutter (shutter speed) for the image sensor 16 based on the image-taking Ev value and in accordance with a program chart, controls the diaphragm based on the determined diaphragm value, and controls the electric charge accumulation time of the image sensor 16 through the sensor control unit 32 based on the determined shutter speed.

When the AE operation finishes and the second-step push (full-push) of the shutter button 38-1 is performed, in response to the push, the image data output from the A/D converter 21 are input from the image input controller 22 to the memory (SDRAM) 48, and are temporarily stored. The image data temporarily stored in the memory 48 are appropriately read by the digital signal processing unit 24, and here, predetermined signal processes including a generation process (YC process) of luminance data and color difference data of the image data are performed. The image data (YC data) after the YC process are stored in the memory 48, again.

The YC data stored in the memory 48 are each output to a compression/decompression processing unit 26, and, after the execution of a predetermined compression process such as JPEG (Joint Photographic Experts Group), are recorded in the memory card 54 through a medium controller 52.

Next, an encoded aperture process (weighted product-sum calculation) to be performed by the digital signal processing unit 24 is described.

Figure 4:
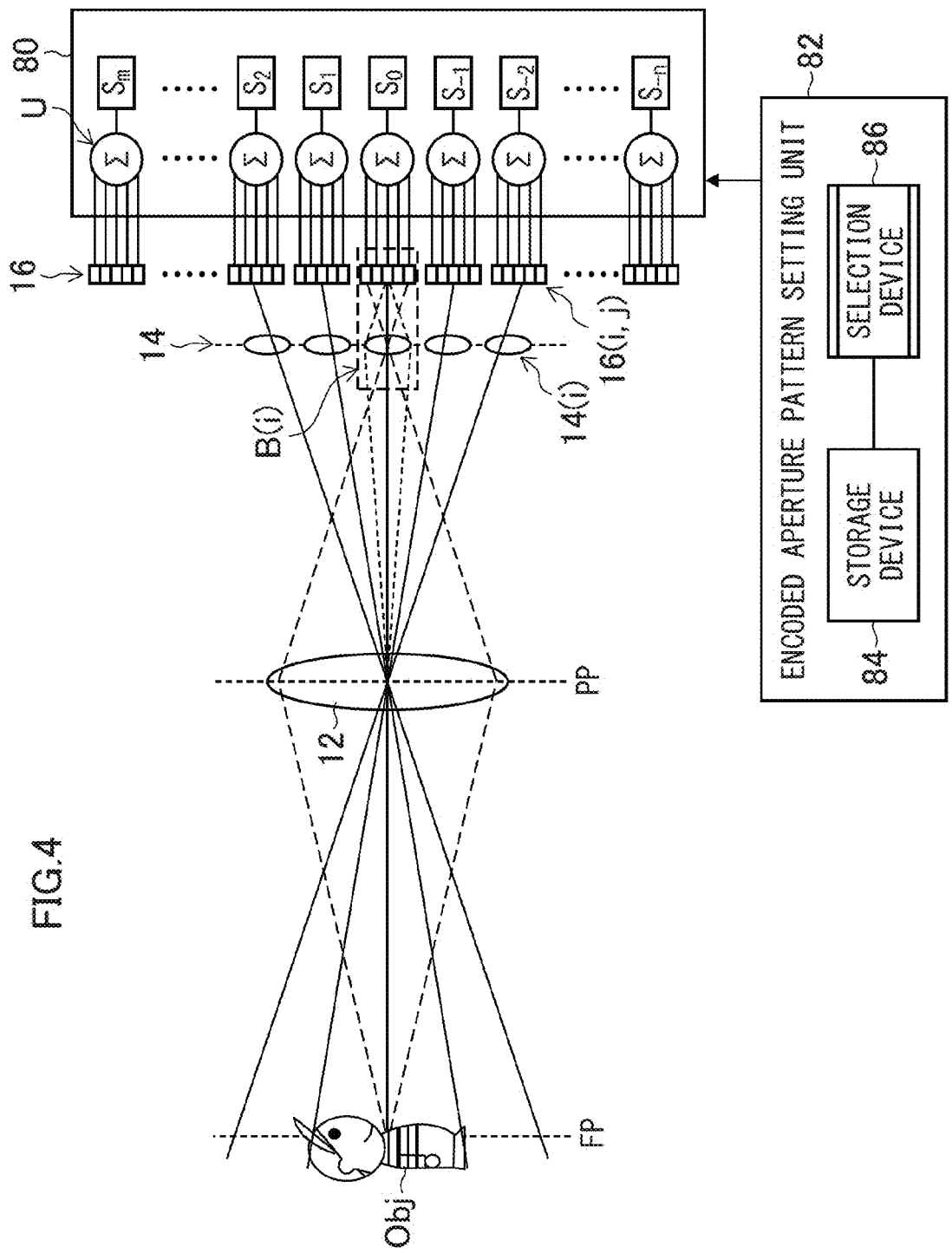
FIG. 4 is a configuration diagram showing the configuration of an encoded aperture association part associated with an encoded aperture process.

FIG. 4 is a configuration diagram showing the configuration of an encoded aperture association part associated with an encoded aperture process. In FIG. 4, the main lens 12 in FIG. 1, the micro-lens array 14, the image sensor 16, and an encoded aperture processing unit 80 involved in the digital signal processing unit 24 are extracted and shown. In FIG. 4, the respective processing units through which the image data taken in the image sensor 16 go until they are read by the encoded aperture processing unit 80 (digital signal processing unit 24), and the respective processing units through which the image data generated by the encoded aperture processing unit 80 go after the output are omitted. Further, an encoded aperture pattern setting unit 82 (encoded aperture pattern setting device) to set and alter a weight coefficient described later in detail is shown.

In the figure, the main lens 12, the micro-lens array 14 and the image sensor 16 constitute a directional sensor according to the first embodiment, which is configured such that, with respect to light rays having entered the main lens 12 from an object Obj present at a position of a focusing distance (a position in a focusing plane FP) that allows the main lens 12 to be in focus, light rays having passed through different regions in the pupil plane PP of the main lens 12 are received by light receiving cells at different positions in the image sensor 16.

That is, assuming that the pupil plane PP is divided into multiple regions (referred to as "divided regions"), image data comparable to one frame of the object Obj are acquired from only light rays to pass through an identical divided region, and thereby, image data of the object Obj comparable to the number of the divided regions can be acquired simultaneously.

In an encoded aperture process described below, for these multiple sets of image data, the weighted product-sum calculation of pixel data for an identical position in the object image is performed with a weight coefficient corresponding to an encoded aperture pattern, and thereby, an image equivalent to an image when a physical encoded aperture is disposed at the pupil position (pupil plane) is obtained.

As shown in the figure, in the micro-lens array 14, each micro-lens 14($i$) (i is a number of m to −n assigned to each micro-lens, and is a sensor block number described later, and m and n are positive integers) is disposed at a position that allows a picture (pupil image) on the pupil plane PP to be formed on the light receiving surface of the image sensor 16, corresponding to the focal distance of each micro-lens 14($i$).

At the rear of the micro-lens array 14, multiple light receiving cells 16($i, j$) (i is the number of a micro-lens, and j is the number assigned to a light receiving cell in the identical number i and is a positive integer) to receive the light rays having entered each micro-lens 14($i$) are disposed. Thereby, the light rays having entered each micro-lens 14($i$) are received by different light receiving cells, depending on the incident directions (the detail is described later).

Here, a set of a micro-lens 14($i$) of an arbitrary number i and multiple light receiving cells 16($i, j$) to receive the light rays having entered the micro-lens 14($i$) of the number i is referred to as a sensor block, and the sensor block including the micro-lens 14($i$) of the number i is described as a sensor block B($i$).

In the directional sensor according to the first embodiment configured in this way, the light rays having diffused from one point (object point) on the focusing plane FP and having entered the main lens 12 are condensed by the main lens 12, and enter the micro-lens 14(*i*) of an identical (a single) sensor block B(i) corresponding to the position of the object point on the focusing plane FP. Then, the light rays having entered the identical micro-lens 14(*i*) enter the light receiving surfaces of the light receiving cells 16(*i, j*) at positions corresponding to the respective incident directions, that is, the positions in the pupil plane PP through which they have passed. Therefore, pixel data for the identical object point are divided into multiple sets of pixel data to be acquired, depending on the positions in the pupil plane PP through which the light rays from the object point have passed.

Further, the light rays having diffused from different object points on the focusing plane FP and having entered the main lens 12 enter the micro-lenses of different sensor blocks, and in the respective micro-lenses, enter the light receiving surfaces of the light receiving cells 16(*i, j*) at positions corresponding to the positions in the pupil plane PP through which they have passed, as described above.

Therefore, image data composed of pixel data for the respective object points of the object Obj on the focusing plane FP are obtained from the whole of the light receiving cells (the whole of the sensor blocks) of the image sensor 16, and image data of the object Obj comparable to multiple frames are obtained when the respective pixel data are divided depending on the positions in the pupil plane PP through which the light rays having entered the respective light receiving cells pass.

Figure 5:
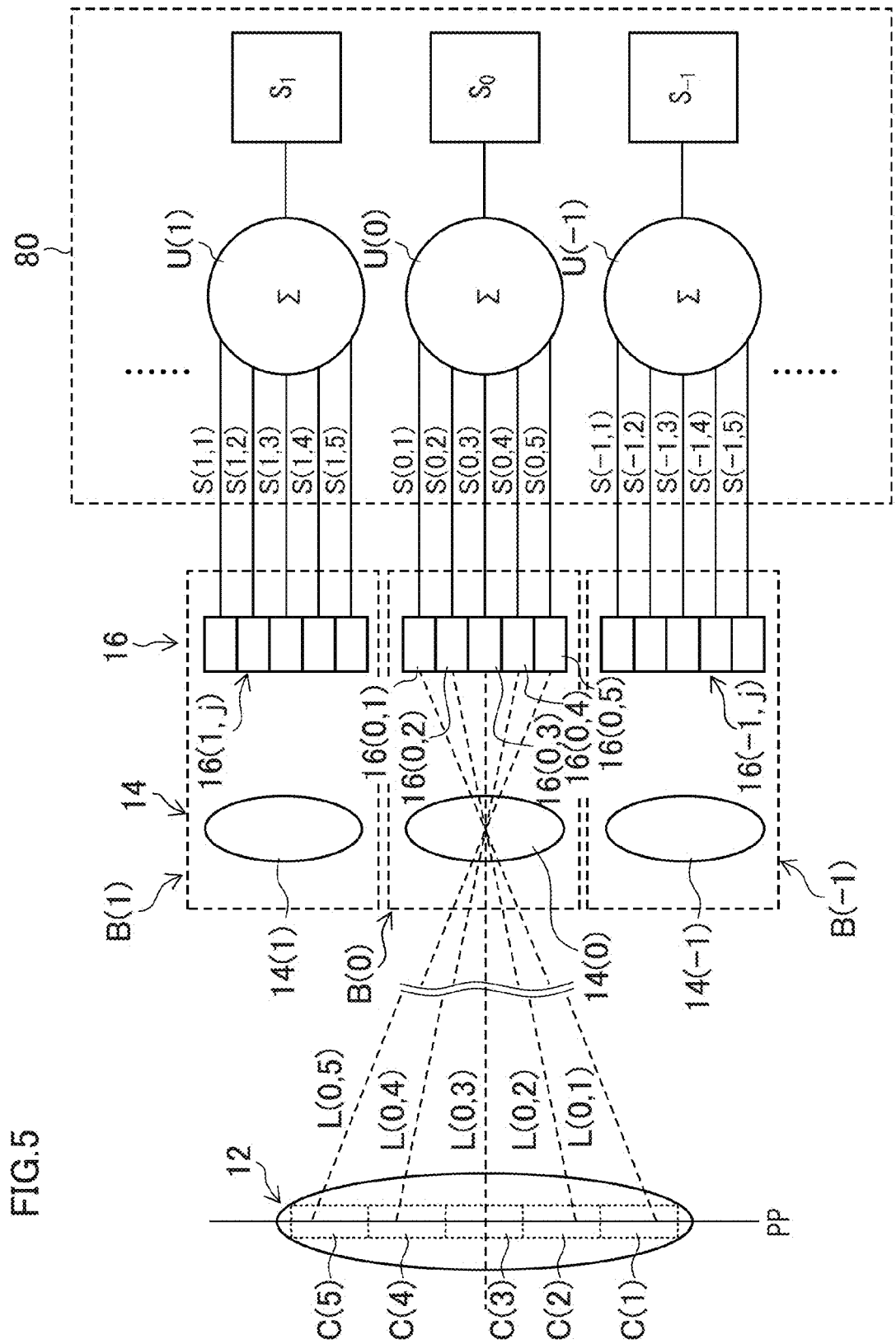
FIG. 5 is an enlarged view showing a part of FIG. 4.

FIG. 5 is an enlarged view showing a part of FIG. 4. The process of the encoded aperture processing unit 80 is described, for example, while paying attention to a sensor block B(0) on the optical axis. Further, although the respective micro-lenses 14(*i*) of the micro-lens array 14 and the respective light receiving cells 16(*i, j*) of the image sensor 16 are arrayed in a two-dimensional form, the description is mainly made assuming that they are arrayed in a one-dimensional form. When the two-dimensional array is considered, the description is appropriately made.

In the figure, when paying attention to the sensor block B(0) on the optical axis, five light receiving cells 16(0, 1) to 16(0, 5) are disposed in a region where the picture (pupil image) on the pupil plane PP is formed by a micro-lens 14(0). Thereby, the light rays having passed through the pupil plane PP and having entered the micro-lens 14(0) enter the light receiving surface of either of the five light receiving cells 16(0, 1) to 16(0. 5), and five sets of pixel data S(0, 1) to S(0, 5) are obtained from the light receiving cells 16(0, 1) to 16(0, 5), respectively.

Here, the region of the pupil plane PP is divided into multiple divided regions C(j) (j is a number of 1 to 5 corresponding to the number of the light receiving cell), depending on regions through which light rays to enter the five respective light receiving cells 16(0, 1) to 16(0, 5) pass. That is, it is divided into five divided regions C(1) to C(5). The divided region C(1) is a region in the pupil plane PP through which a light ray to enter the micro-lens 14(0) and to enter the light receiving surface of the light receiving cell 16(0, 1) as typified by a light ray L(0, 1) in the figure passes. The divided region C(2) is a region in the pupil plane PP through which a light ray to enter the micro-lens 14(0) and to enter the light receiving surface of the light receiving cell 16(0, 2) as typified by a light ray L(0, 2) passes. The divided region C(3) is a region in the pupil plane PP through which a light ray to enter the micro-lens 14(0) and to enter the light receiving surface of the light receiving cell 16(0, 3) as typified by a light ray L(0, 3) passes. The divided region C(4) is a region in the pupil plane PP through which a light ray to enter the micro-lens 14(0) and to enter the light receiving surface of the light receiving cell 16(0, 4) as typified by a light ray L(0, 4) passes. The divided region C(5) is a region in the pupil plane PP through which a light ray to enter the micro-lens 14(0) and to enter the light receiving surface of the light receiving cell 16(0, 5) as typified by a light ray L(0, 5) passes.

The division number of divided regions when the pupil plane PP is divided in this way is different depending on how many light receiving cells are disposed in each region of the image sensor 16 where a picture on the pupil plane PP is formed by each micro-lens 14(*i*). As the number is increased, the number of divided regions by the division of the pupil plane PP is increased, allowing for a minute division. Also, the form of the division is different depending on the array of the light receiving cells and the like.

Further, it can be interpreted that the respective light receiving cells 16(0, 1) to 16(0, 5) perform the imaging of the picture (pupil image) on the pupil plane PP, and the respective light receiving cells 16(0, 1) to 16(0, 5) perform the imaging of the respective divided regions C(1) to C(5) and acquire them as pixel data.

Pixel data S(0, 1) to S(0, 5) obtained by the respective light receiving cells 16(0, 1) to 16(0, 5) of the sensor block B(0) are taken in the encoded aperture processing unit 80. Then, the pixel data S(0, 1) to S(0, 5) are read by a weighted product-sum calculating device U(0) of a weighted product-sum calculating device U(i) (i is the number of the corresponding sensor block) provided corresponding to the respective sensor blocks B(i), and a weighted product-sum calculation with a weight coefficient $\alpha j$ ($\alpha j$ is a real number of 0 or more and 1 or less, and j is a number of 1 to 5 corresponding to the number of the light receiving cell) corresponding to an encoded aperture pattern is performed, so that a weighted product-sum value S0 is calculated by the following formula (1).

$$S0 = \alpha 1 \cdot S(0,1) + \alpha 2 \cdot S(0,2) + \alpha 3 \cdot S(0,3) + \alpha 4 \cdot S(0,4) + \alpha 5 \cdot S(0,5) = \Sigma \alpha j \cdot S(0,j)(j=1 \text{ to } 5) \quad (1)$$

According to this, the pixel data S0 calculated as the weighted product-sum value S0 is equivalent to pixel data to be obtained when optical filters (two-dimensional filters) with light transmittances corresponding to the respective values of the weight coefficients $\alpha 1$ to $\alpha 5$ are disposed for the divided regions C(1) to C(5) in the pupil plane PP respectively and the light rays having entered the micro-lens 14(0) (the light rays from object points in the focusing plane FP) are received by a single light receiving cell like an ordinary image sensor.

Similarly, as for an arbitrary sensor block B(i) (i is an arbitrary number) other than the sensor block B(0), the light rays having passed the divided region C(j) in the pupil plane PP enter the light receiving cells 16(*i, j*) (j is a number of 1 to 5 assigned to the light receiving cells) to receive the light rays having entered the micro-lens 14(*i*), and the respective light receiving cells 16(*i*, 1) to 16(*i*, 5) perform the imaging of the pictures (pupil images) of the respective divided regions C(1) to C(5) in the pupil plane PP.

The pixel data S(i, 1) to S(i, 5) obtained in this way are taken in the encoded aperture processing unit 80, and are read by the weighted product-sum calculating device U(i) corresponding to the sensor block B(i). Then, a weighted product-sum calculation with a weight coefficient $\alpha j$ corresponding to the encoded aperture pattern is performed for the pixel data S(i, 1) to S(i, 5), and similarly to the above formula (1), the weighted product-sum value Si (i is a number corresponding to the sensor block number i) is calculated by the following formula (2).

$$Si=\alpha 1 \cdot S(i,1)+\alpha 2 \cdot S(i,2)+\alpha 3 \cdot S(i,3)+\alpha 4 \cdot S(i,4)+\alpha 5 \cdot S(i,5)=\Sigma \alpha j \cdot S(i,j)(j=1 \text{ to } 5) \quad (2)$$

According to this, one-frame image data having a pixel number equivalent to the total number of the sensor blocks B(i), that is, the lens number of the micro-lenses 14(i) are generated. Then, it is can be said that the pixel data Si calculated as the weighted product-sum value Si by the above formula (2) for the pixel data S(i, 1) to S(i, 5) obtained by a sensor block B(i) at an arbitrary position are equivalent to pixel data to be obtained when optical filters with light transmittances corresponding to the respective values of the weight coefficients α1 to α5 are disposed for the divided regions C(1) to C(5) in the pupil plane PP respectively and the light rays having entered the micro-lens 14(i) (the light rays from object points in the focusing plane FP) are received by a single light receiving cell like an ordinary image sensor. That is, this is equivalent to the convolution between a subject image of the main lens 12 and encoded aperture patterns of two-dimensional filters having the weight coefficients α1 to α5.

Therefore, by changing the respective values of the weight coefficients α1 to α5, it is possible to virtually dispose encoded apertures having various patterns, on the pupil plane PP, and it is possible to generate image data of an object that are acquired by an ordinary image sensor when the encoded apertures having the various patterns are physically disposed on the pupil plane PP.

Further, without changing the encoded aperture pattern for each image taking, it is possible to generate image data when encoded apertures having different patterns are disposed on the pupil plane PP, for image data (pixel data) acquired by a one-time image taking. By saving original image data, it is possible to generate, when necessary, image data when an encoded aperture having a necessary pattern is disposed.

Here, it has been described that the weighted product-sum calculating device U(i) is provided for each sensor block B(i). However, by sequentially reading the image data S(i, 1) to S(i, 5) acquired by the respective sensor blocks B(i) and performing the weighted product-sum calculation, the number of the weighted product-sum calculating device can be reduced to one, or can be reduced to lower than the number of the sensor blocks B(i).

Here, an encoded aperture pattern when considering that the multiple light receiving cells 16(i, j) of each sensor block B(i) actually have a two-dimensional array instead of a one-dimensional array described above is described.

When the multiple light receiving cells 16(i, j) of each sensor block B(i) are arrayed in a two-dimensional form, the light rays having entered each micro-lens 14(i) are received by the multiple light receiving cells 16(i, j) arrayed in a two-dimensional form, depending on the incident angles, and the pictures (pupil images) on the pupil plane PP are imaged by the light receiving cells 16(i, j).

On this occasion, the divided regions C(j) (j is a number corresponding to the number of the light receiving cell) in the pupil plane PP have a two-dimensional array corresponding to the array of the light receiving cells 16(i, j). The light rays having passed through the divided region C(j) and having entered the micro-lens 14(i) are received by the light receiving cells 16(i, j), and the picture on the divided region C(j) in the pupil plane PP is imaged by the light receiving cells 16(i, j).

Figure 6:
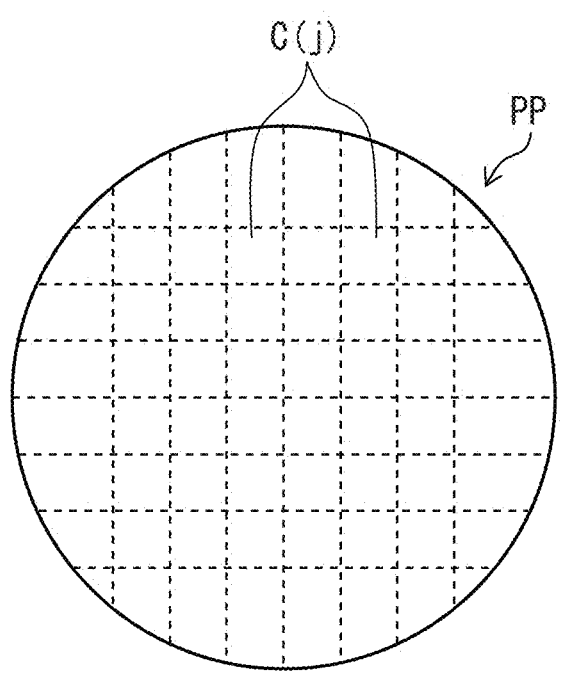
FIG. 6 is a diagram showing an example of divided regions in a pupil plane.

FIG. 6 is a diagram showing the divided regions C(j) (j=1 to 64) corresponding to the respective light receiving cells 16(i, j) when the number of the light receiving cells 16(i, j) of each sensor block B(i) is, for example, a total number of 64 (j=1 to 64) of 8×8 vertically and horizontally.

Assuming that similarly to the case of the one-dimensional array, optical filters (two-dimensional filters) having light transmittances of αj (j=1 to 64) are disposed for the divided regions C(j) arrayed in a two-dimensional form in this way, the pixel data Si to be obtained by an ordinary image sensor can be obtained by a weighted product-sum calculation using the same weight coefficients αj as the above formula (2), as the weighted product-sum value Si in the following formula (3).

$$Si=\Sigma \alpha j \cdot S(i,j)(j=1 \text{ to } 64) \quad (3)$$

Even when the number of the light receiving cells 16(i, j) arrayed in a two-dimensional form is not 64, or whatever the form of the array is, by calculating the weighted product-sum value Si in accordance with the above formulas (2) and (3), it is possible to calculate pixel data when encoded apertures of two-dimensional filters having light transmittances of the weight coefficients αj are disposed on the respective divided regions C(j) in the pupil plane PP corresponding to the respective light receiving cells 16(i, j). It is preferable that the number of the light receiving cells 16(i, j) for one sensor block B(i) be a total number of 256 (j=1 to 256) of 16×16 vertically and horizontally.

Figure 7A:
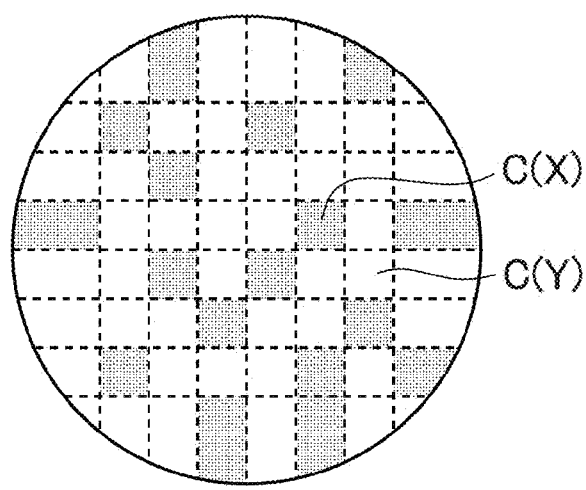
FIG. 7A is a diagram exemplifying an encoded aperture pattern.
Figure 7B:
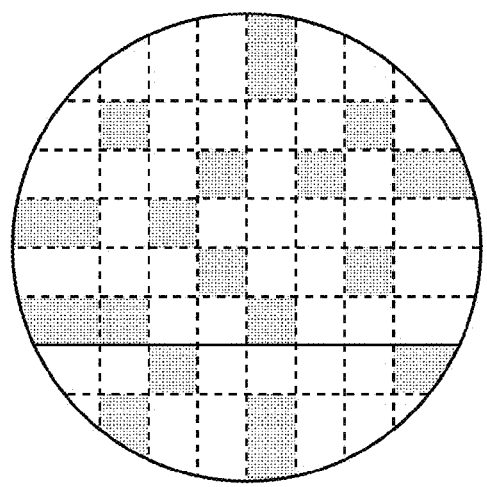
FIG. 7B is a diagram exemplifying an encoded aperture pattern.
Figure 7C:
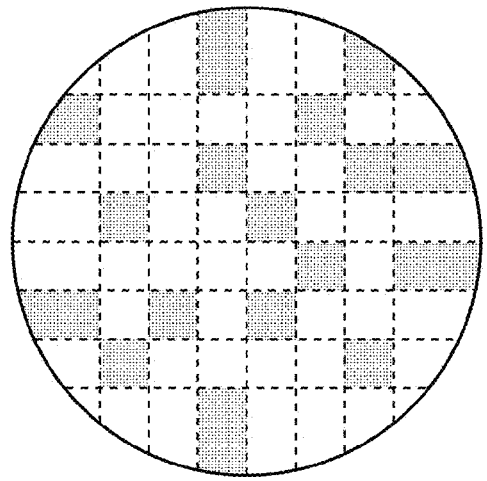
FIG. 7C is a diagram exemplifying an encoded aperture pattern.

FIG. 7A to FIG. 7C are diagrams exemplifying encoded aperture patterns when a light-blocked (light transmittance of 0) or opened (light transmittance of 1) encoded aperture is disposed on each of the divided regions C(j) divided as shown in FIG. 6. In these figures, black divided regions show the light blocking, and white divided regions show the opening. In the example of FIG. 7A, a black divided region C(X), for example, is a light-blocked region, and on this occasion, a weight coefficient αX is 0. On the other hand, in FIG. 7A, a white divided region C(Y) is an opened region, and on this occasion, a weight coefficient αY is I.

Next, a configuration part for setting the above weight coefficient αj and setting the encoded aperture pattern is described. As shown in FIG. 4, the encoded aperture processing unit 80 including the weighted product-sum calculating device U(i) (i is the number of the corresponding sensor block) is connected with the encoded aperture setting unit 82 (encoded aperture pattern setting device).

The encoded aperture pattern setting unit 82 includes a storage device 84 for storing multiple types of encoded aperture patterns, and a selection device 86 for selecting an encoded aperture pattern to be read from the storage device 84.

The storage device 84 corresponds to an arbitrary memory such as the EEPROM (Electronically Erasable and Programmable Read Only Memory) 56 in FIG. 1, for example. The encoded aperture pattern stored in the storage device 84 is the information relevant to encoded aperture patterns as shown in FIG. 7A to FIG. 7C that are set corresponding to the divided regions C(j) in the pupil plane PP shown in FIG. 6, and for example, data of the above weight coefficients αj indicating the light transmittances of the respective divided regions C(j) are held for each type of the encoded aperture patterns.

For example, the selection device 86 includes an arbitrary operation switch for the CPU 40 and the operation unit 38 in FIG. 1. When a user selects, with the operation unit 38, an intended encoded aperture pattern from the multiple types of encoded aperture patterns stored in the storage device 84, the CPU 40 reads the data of the selected encoded aperture pattern from the storage device 84, and gives the weight coefficients αj corresponding to the encoded aperture pattern, to the encoded aperture processing unit 80.

The encoded aperture processing unit 80 sets the weight coefficients αj given from the encoded aperture pattern setting unit 82 in the above way, as the weight coefficients αj to be used for the weighted product-sum calculations in the respective weighted product-sum calculating device U(i), and then performs the above weighted product-sum calculations.

Here, the selection device 86 of the encoded aperture pattern setting unit 82, instead of the device for the selection of an intended encoded aperture pattern by a user, may sequentially select multiple types of encoded aperture patterns that are determined in advance, and may give them to the encoded aperture processing unit 80. Thereby, the weighted product-sum calculations with the multiple types of encoded aperture patterns may be sequentially performed for one-frame taken image data, and the parallel display or switching display of the processed images on the liquid crystal monitor 30, the saving to the memory card 54, or the like may be automatically performed.

Further, although the encoded aperture processing unit 80 performs the weighted product-sum calculations using weight coefficients αj of identical values (an identical encoded aperture pattern) for the respective sensor blocks B(i), it is allowable that different weight coefficients αj (encoded aperture patterns) can be set for each sensor block B(i) (for each pupil image of the respective micro-lenses 14(i), that is, for each weighted product-sum calculating device U(i)).

Thereby, it is possible to generate pixel data in which multiple different types of encoded aperture patterns have been applied to the pixel data (pixel groups) obtained from the respective sensor blocks B(i).

That is, it is possible to generate image data in which encoded aperture patterns different depending on the position of the object point have been applied, and it is possible to obtain an effect that is impossible when an encoded aperture is physically disposed on the pupil plane PP. In this case, the encoded aperture pattern setting unit 82 gives the encoded aperture pattern (weighted coefficient αj) for each sensor block B(i), to the encoded aperture processing unit 80.

Further, in the above description, the weighted coefficient αj is a value of 0 or more and 1 or less, but is not limited to this. It may be a minus value, or may be a value more than 1.

Furthermore, it is allowable that a user can arbitrarily designate and set the value of the weighted coefficient αj. In this case, the encoded aperture pattern setting unit 82 includes a designation device, and the designation device can be a device using a predetermined operation switch of the operation unit 38 in FIG. 1.

Figure 8:
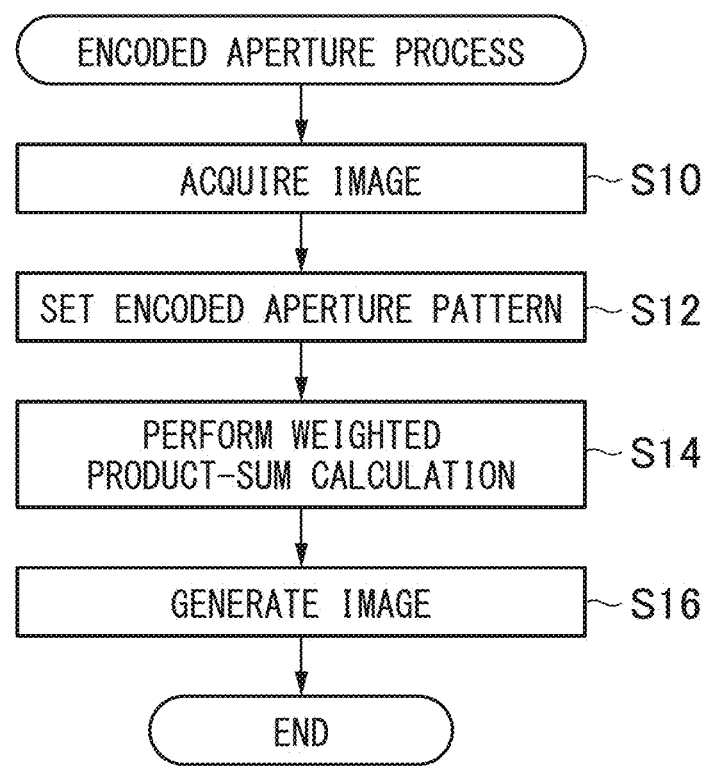
FIG. 8 is a flowchart showing an encoded aperture process.

Next, a procedure of the encoded aperture process to be performed mainly in the above encoded aperture processing unit 80 is described using a flowchart of FIG. 8.

In step S10, the encoded aperture processing unit 80 acquires the image data (the above pixel data S(i, j)) picked up by the image sensor 16 (image acquiring process).

Then, the process is transited to step S12.

In step S12, the encoded aperture pattern setting unit 82 sets the weight coefficients αj (encoded aperture pattern) to be used in the weighted product-sum calculating device U(i) (encoded aperture pattern setting process). Then, the process is transited to step S14.

In step S14, the weighted product-sum calculating device U(i) of the encoded aperture processing unit 80 performs the weighted product-sum calculation between the pixel data S(i, j) of the pupil image and the weight coefficients αj for each sensor block B(i) (for each micro-lens), to calculate the weighted product-sum value Si as the pixel data Si (weighted product-sum calculation process). Then, the process is transited to step S16.

In step S16, an image having a pixel number (resolution) equivalent to the lens number of the micro-lenses 14(i) is generated from the pixel data Si calculated in step S14 (image generating process). Then, the process of the flowchart is finished. The image data generated in this way are transferred from the encoded aperture processing unit 80 to another processing unit, for the saving to the memory card 54 in FIG. 1, the display on the liquid crystal monitor 30, or the like.

Here, whenever the weight coefficients αj are altered by the encoded aperture setting unit 82, the encoded aperture processing unit 80 may perform a weighted product-sum calculation using the altered weight coefficients αj, for an identical image, and may generate an image in which the encoded aperture process has been performed.

Further, the above-described process relevant to the encoded aperture can be performed regardless of whether to be the image taking of a still image or the image taking of a moving image.

Figure 9:
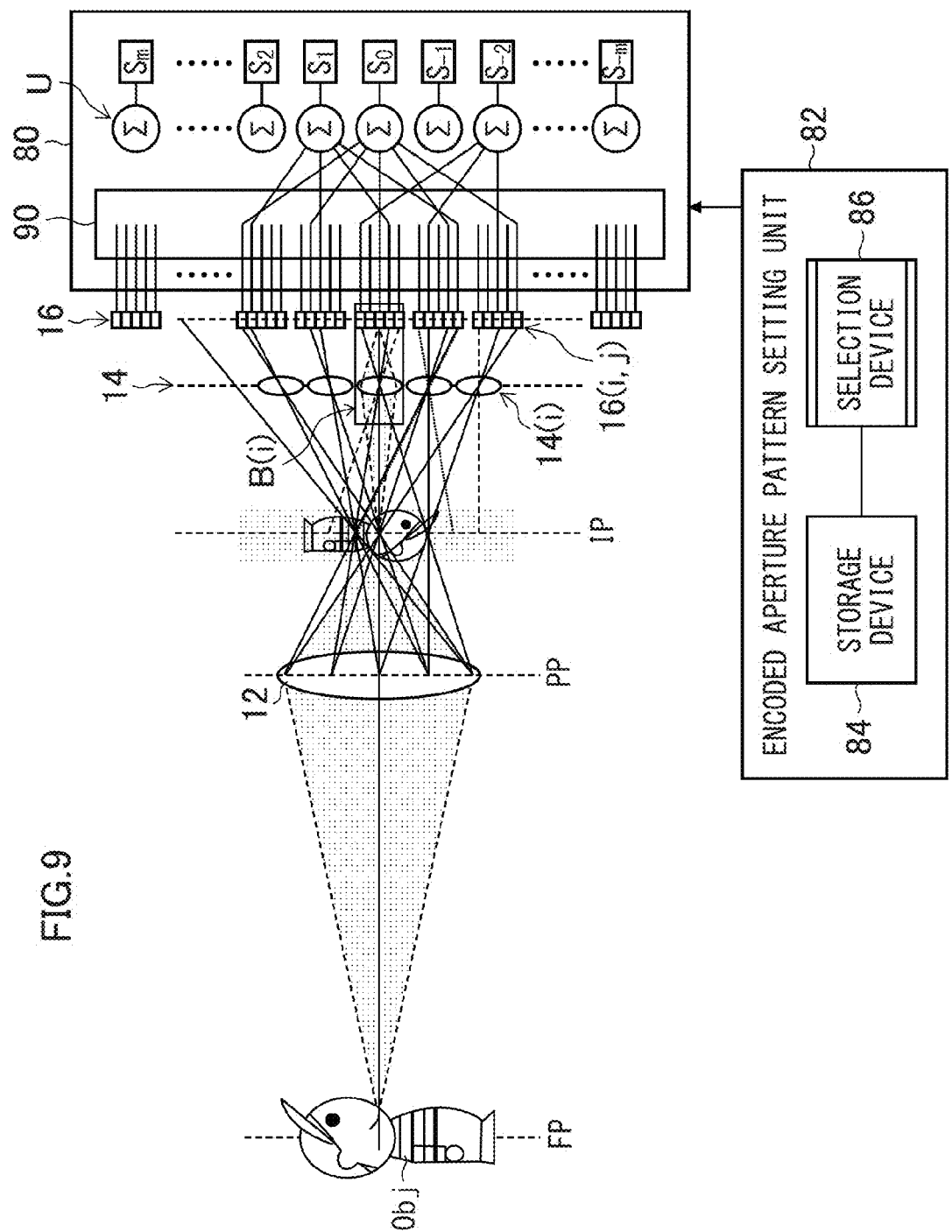
FIG. 9 is a configuration diagram showing the configuration of an encoded aperture association part using a directional sensor according to a second embodiment.

FIG. 9 is a configuration diagram showing the configuration of an encoded aperture association part in the case of using a directional sensor according to a second embodiment that is different from the directional sensor according to the first embodiment in FIG. 4. In FIG. 9, identical reference characters are assigned to constituent elements identical or similar to FIG. 4 and FIG. 5, and the descriptions are omitted.

In the figure, the main lens 12, the micro-lens array 14 and the image sensor 16 constitutes a directional sensor, and the main lens 12, the micro-lens 14 and the image sensor 16 each have the same configurations as the directional sensor according to the first embodiment shown in FIG. 4 and the like.

On the other hand, it is different from the directional sensor in FIG. 3, in that the light rays having diffused from one point (object point) on the focusing plane FP and having entered the main lens 12 enter different micro-lenses 14(i) of the micro-lens array 14, and are received at distant positions by light receiving cells 16(i, j) of an image sensor 16 that is disposed at the rear of the micro-lenses 14(i). Here, similarly to the directional sensor according to the first embodiment, a set of a micro-lens 14(i) of an arbitrary number i and multiple light receiving cells 16(i, j) to receive the light rays having entered the micro-lens 14(i) of the number i is referred to as a sensor block B(i).

As shown in the figure, the micro-lens array 14 is disposed at a position that allows each micro-lens 14(i) to form a picture on an image-forming plane by the main lens 12, on the light receiving surface of each light receiving cell 16(i, j) of the image sensor 16, corresponding to the focal distance of each micro-lens 14(i).

That is, when the focal distance of the micro-lens 14(i) is f and the distance between the micro-lens 14(i) and the light receiving cell 16(i, j) is b', the micro-lens 14(i) forms, on the light receiving cell 16(i, j), a picture on a plane (image-forming plane IP) anterior by a distance a', which is determined from the relation of the following formula (4).

$$1/f = 1/a' + 1/b' \qquad (4)$$

When the distance between the image-forming plane IP and the main lens 12 is b and the focal distance of the main lens 12 is f, the main lens 12 is disposed at a position that allows at least the distance b to be longer than the focal distance f. On this occasion, the main lens 12 forms, on the above image-forming plane IP, an object Obj on the focusing plane FP, by adopting, as the focusing plane FP, a plane anterior by a distance a, which is determined from the relation of the following formula (5).

$$1/f = 1/a + 1/b \quad (5)$$

Similarly to the directional sensor according to the first embodiment, multiple light receiving cells 16(i, j) to receive the light rays having entered the respective micro-lenses 14(i) are disposed at the rear of the respective micro-lenses 14(i) of the micro-lens array 14. Thereby, the light rays having entered the respective micro-lenses 14(i) are received by light receiving cells that are different depending on the incident directions (the detail is described later).

In the directional sensor according to the second embodiment configured in this way, the light rays having diffused from one point (object point) on the focusing plane FP and having entered the main lens 12 are condensed by the main lens 12, pass through positions that are image points on the image-forming plane IP, and enter micro-lenses 14(i) of sensor blocks B(i) at multiple positions corresponding to the travelling directions of the light rays. Each of the light rays having entered the respective micro-lenses 14(i) enters a light receiving cell 16(i, j) at a position in a sensor block B(i) corresponding to the incident direction and the position in the pupil plane PP through which it has passed. Therefore, pixel data for an identical object point are divided into multiple sets of pixel data to be acquired, depending on the positions in the pupil plane PP through which the light rays from the object point have passed.

Further, in the embodiment, light rays having diffused from different object points on the focusing plane FP and having entered the main lens 12 enter an identical micro-lens 14(i), but since they pass through different positions in the image-forming plane IP, they enter the micro-lens 14(i) from different directions, and enter the light receiving surfaces of light receiving cells 16(i, j) at different positions.

Therefore, image data composed of pixel data for the respective object points of the object Obj in the focusing plane FP are obtained from the whole of the light receiving cells (the whole of the sensor blocks) of the image sensors 16, and image data of the object Obj comparable to multiple frames are obtained when the respective pixel data are divided depending on the positions in the pupil plane through which the light rays having entered the respective light receiving cells pass.

Figure 10:
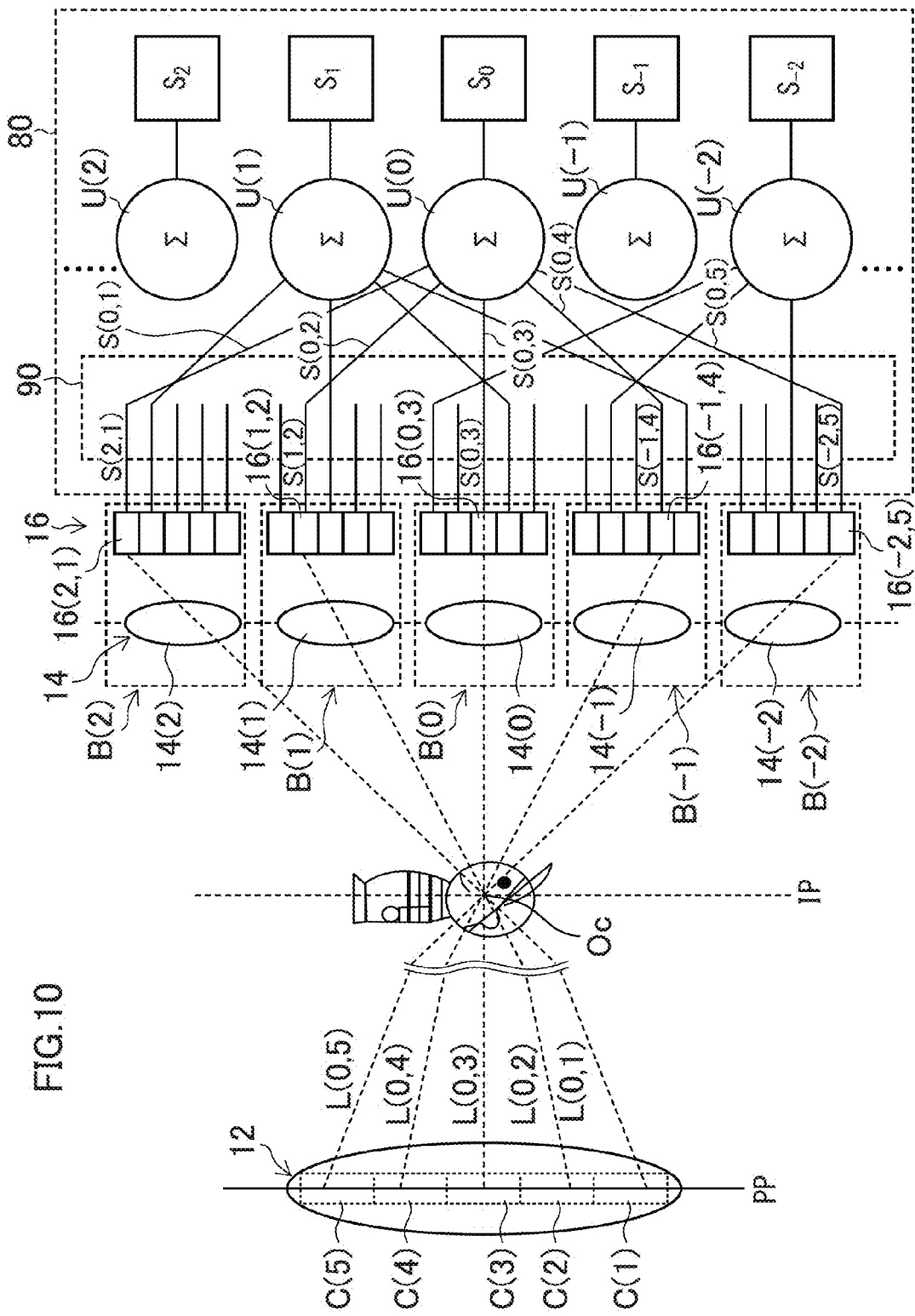
FIG. 10 is an enlarged view showing a part of FIG. 9.

FIG. 10 is an enlarged view showing a part of FIG. 9. The description is made, for example, while paying attention to sensor blocks (−1), (−2), 0, 1 and 2 centering on a sensor block B(0) on the optical axis.

In the figure, the respective light rays having diffused from a point on the optical axis of the object Obj on the focusing point FP and having entered the main lens 12, as typified by light rays L(0, 1) to L(0, 5), pass through different regions in the pupil plane PP, and thereafter, intersect at a center point Oc where the image-forming plane IP and the optical axis cross, to produce a picture. Similarly, the respective light rays having diffused from another point of the object Obj on the focusing plane FP and having entered the main lens 12 produces a picture on the image-forming plane IP of the main lens 12, and the object Obj is imaged on the image-forming plane IP, as a reverted image.

The respective light rays having intersected at the center point Oc in the image-forming plane IP, such as the light rays L(0, 1) to L(0, 5), depending on the position in the pupil plane PP through which each of them has passed, enter the respective micro-lenses 14(2) to 14(−2) of different sensor blocks B(2), B(1), B(0), B(−1) and B(−2), and enter the light receiving surfaces of light receiving cells 16(2, 1), 16(1, 2), 16(0, 3), 16(−1, 4) and 16(−2, 5) that are disposed in the sensor blocks B(2) to B(−2) respectively.

Therefore, by those light receiving cells, pixel data for one object point are obtained as five sets of pixel data S(2, 1), S(1, 2), S(0, 3), S(−1, 4) and S(−2, 5).

That is, the micro-lens 14(i) of each sensor block B(i) reforms the picture on the image-forming plane IP formed by the main lens 12, on the light receiving surfaces of the respective light receiving cells 16(i, j) in the identical sensor block B(i), and unlike the first embodiment, an object image (partial image) is formed in each of the sensor blocks B(i).

Therefore, pictures for an identical object point are formed in the multiple sensor blocks B(i), and they are formed by light rays having passed through different regions in the pupil plane PP.

Here, the range of the object image to be reformed in each sensor block B(i) is different depending on the position of each sensor block B(i). That is, for the object image to be imaged from the whole of the image sensor 16, the micro-lens 14(i) of each sensor block B(i) forms the image of a partial range, as a partial image, and forms a partial image that is different depending on the position of the sensor block B(i).

Therefore, a picture for an identical object point is formed only in a predetermined range of sensor blocks B(i), and is light-received by a particular number of light receiving cells that are at particular positions. In the example of the figure, the range of the light rays to pass through the pupil plane PP and to pass through the center point Oc in the image-forming plane IP is limited to the five micro-lenses 14(2) to 14(−2). Therefore, the picture for the identical object point is light-received by the five light receiving cells, and is obtained as five sets of pixel data. Further, in response to this, similarly to the divided regions in the first embodiment, the pupil plane PP is divided into five divided regions C(1) to C(5).

The encoded aperture processing unit 80 includes a pixel collection processing unit 90 (pixel collecting device) that, unlike the first embodiment, collects pixel data for an identical object point from the pixel data obtained by the respective sensor blocks B(i), and that, similarly to the first embodiment, distributes them to the weighted product-sum calculating device U(i). That is, the pixel collection processing unit 90 collects pixel data corresponding to an identical position in the object image, from the partial images obtained by the respective sensor blocks B(i), and transfers the pixel data corresponding to the identical position, to the weighted product-sum calculating device U(i).

On this occasion, when similarly to the first embodiment, identification signs such as S(i, j) are assigned to the respective pixel data depending on the divided regions C(j) in the pupil plane PP through which they pass, it is possible to generate pixel data in which the encoded aperture process has been performed by a weighted product-sum calculation with the weight coefficients αj that is Si=Σαj·S(i, j), similarly to the above formulas (1) to (3).

For example, in the example of FIG. 10, the pixel collection processing unit 90 collects pixel data S(2, 1), S(1, 2), S(0, 3), S(−1, 4) and S(−2, 5) obtained by light receiving cells 16(2, 1), 16(1, 2), 16(0, 3), 16(−1, 4) and 16(−2, 5), which light rays L(0, 1) to L(0, 5) having passed through the center point Oc in the image-forming plane IP enter, as the pixel data corresponding to an identical position in the object image, and transfers the pixel data $S(2, 1)$, $S(1, 2)$, $S(0, 3)$, $S(-1, 4)$ and $S(-2, 5)$ to a weighted product-sum calculating device U(0), as $S(0, 1)$, $S(0, 2)$, $S(0, 3)$, $S(0, 4)$ and $S(0, 5)$. Thereby, similarly to the above formulas (1) to (3), it is possible to generate pixel data S0 in which the encoded aperture process has been performed by a weighted product-sum calculation with the weight coefficients $\alpha j$ that is $S0=\Sigma \alpha j \cdot S(0, j)$.

It is possible to generate one-frame image data composed of the pixel data that are generated in this way. Also in the second embodiment, it is possible to obtain image data having a pixel number (resolution) equivalent to the lens number of the micro-lenses $14(i)$.

Here, in the case of using the directional sensor according to the second embodiment, there is no great difference from the first embodiment, except that a process (step) in which the above pixel collection processing unit 90 collects the pixel data for an identical object point (the same position in the object image) from the pixel data obtained by the respective light receiving cells $16(i, j)$ of the image sensor 16 is added after step S10 of FIG. 8 according to the first embodiment. Therefore, the same as the case of using the directional sensor according to the first embodiment can be applied to the case of using the directional sensor according to the second embodiment.

Figure 11:
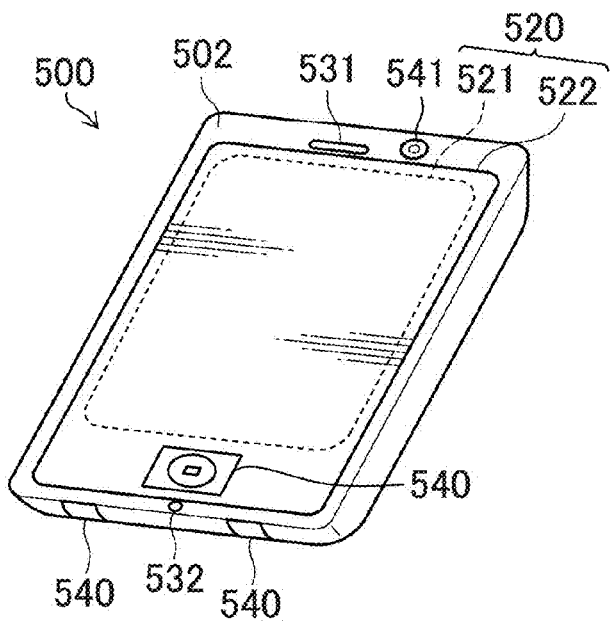
FIG. 11 is an appearance diagram of a smartphone that is another embodiment of an image pickup device.

FIG. 11 shows an external view of a smartphone 500 that is an alternative embodiment of the image pickup device 10. The smartphone 500 shown in FIG. 11 has a case 502 in a flat plate shape, and, on one surface of the case 502, includes a display/input unit 520 in which a display panel 521 as a display unit and an operation panel 522 as an input unit are unified. Further, the case 502 is provided with a speaker 531, a microphone 532, an operation unit 540 and a camera unit 541. Here, the configuration of the case 502 is not limited to this. For example, a configuration in which the display unit and the input unit are separated can be adopted, or a configuration of having a folding structure or a sliding mechanism can be adopted.

Figure 12:
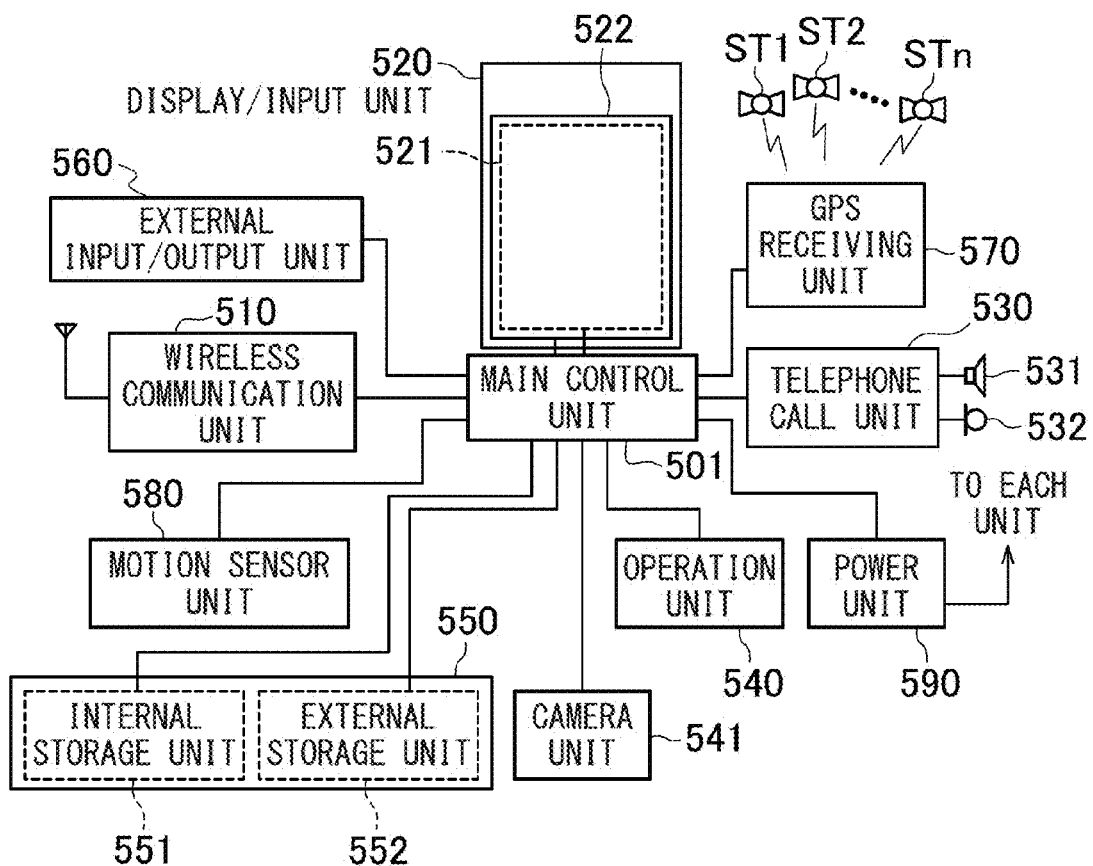
FIG. 12 is a block diagram showing the configuration of the principal part of the smartphone.

FIG. 12 is a block diagram showing the configuration of the smartphone 500 shown in FIG. 11. As shown in FIG. 12, the smartphone includes a wireless communication unit 510, the display/input unit 520, a telephone call unit 530, the operation unit 540, the camera unit 541, a storage unit 550, an external input/output unit 560, a GPS (Global Positioning System) receiving unit 570, a motion sensor unit 580, a power unit 590, and a main control unit 501, as the main constituent elements. Further, the smartphone 500 has a wireless communication function to perform the mobile wireless communication through a base station device BS and a mobile communication network NW, as the main function.

The wireless communication unit 510 performs a wireless communication with a base station device BS contained in a mobile communication network NW, in accordance with an instruction of the main control unit 501. Using the wireless communication, the sending and receiving of various file data such as audio data and image data, e-mail data or the like, and the receiving of Web data, streaming data or the like are performed.

The display/input unit 520 is a so-called touch panel that, by the control from the main control unit 501, displays an image (a still image and a moving image), character information or the like to visually transmit the information to a user, and therewith, detects the user operation to the displayed information, and includes the display panel 521 and the operation panel 522. In the case of viewing a generated 3D image, it is preferable that the display panel 521 be a 3D display panel.

The display panel 521 is an LCD (Liquid Crystal Display), an OELD (Organic Electro-Luminescence Display) or the like that is used as a display device.

The operation panel 522 is a device that is placed such that an image to be displayed on the display surface of the display panel 521 can be visually recognized and that detects a single or multiple coordinates to be operated by a finger of a user or a stylus. When this device is operated by a finger of a user or a stylus, a detection signal generated due to the operation is output to the main control unit 501. Next, the main control unit 501 detects the operation position (coordinate) on the display panel 521, based on the received detection signal.

As shown in FIG. 11, the display panel 521 and operation panel 522 of the smartphone 500 are unified to constitute the display/input unit 520, and are arranged such that the operation panel 522 completely covers the display panel 521. In the case of adopting this arrangement, the operation panel 522 may have the function to detect the user operation, also in the region outside the display panel 521. In other words, the operation panel 522 may include a detection region that is the superposition part overlapping with the display panel 521 (hereinafter, referred to as a display region), and a detection region that is other than it and that is the outer edge part not overlapping with the display panel 521 (hereinafter, referred to as a non-display region).

Here, the size of the display region and the size of the display panel 521 may accord completely, but both does not always need to accord. Further, the operation panel 522 may include two sensitive regions: the outer edge part and the inner part that is other than it. Moreover, the width of the outer edge part is appropriately designed depending on the size of the case 502 and the like. Furthermore, examples of the position detection scheme to be adopted in the operation panel 522 include a matrix switch scheme, a resistive film scheme, a surface acoustic wave scheme, an infrared ray scheme, an electromagnetic induction scheme and an electrostatic capacity scheme, and any scheme can be adopted.

The telephone call unit 530, which includes the speaker 531 and the microphone 532, converts a user voice input through the microphone 532 into audio data capable of being processed in the main control unit 501, to output it to the main control unit 501, and decodes audio data received by the wireless communication unit 510 or the external input/output unit 560, to output it from the speaker 531. Further, as shown in FIG. 11, for example, the speaker 531 can be mounted on the same surface as a surface on which the display/input unit 520 is provided, and the microphone 532 can be mounted on the side surface of the case 502.

The operation unit 540 is a hardware key using a key switch or the like, and receives an instruction from a user. For example, the operation unit 540, which is mounted on the lower surface below the display unit of the case 502 of the smartphone 500, is a push-button switch that is turned on when being pushed by a finger or the like and becomes the off state by the restring force of a spring or the like when the finger is released.

The storage unit 550 stores a control program and control data of the main control unit 501, address data associated with the name, telephone number and others of a communication partner, sent or received e-mail data, Web data downloaded by Web browsing, and downloaded content data, and further, temporarily stores streaming data or the like. Further, the storage unit 550 is constituted by an internal storage unit 551 built in the smartphone, and an external storage unit 552 having a detachable external memory slot. Here, each of the internal storage unit 551 and the external storage unit 552 that constitute the storage unit 550 is implemented by using a storing medium such as a flash memory type memory, a hard disk type memory, multimedia card micro type memory, card type memory (for example, Micro SD® memory or the like), a RAM (Random Access Memory), or a ROM (Read Only Memory).

The external input/output unit 560 plays a role as an interface to all external apparatuses that is linked with the smartphone 500, and is directly or indirectly connected with another external apparatus, through a communication (for example, the universal serial bus (USB), IEEE1394 or the like), or a network (for example, the internet, a wireless LAN, Bluetooth®, RFID (Radio Frequency Identification), the infrared communication (Infrared Data Association: IrDA)®, UWB (Ultra Wideband)®, ZigBee®, or the like).

Examples of the external apparatus to be linked with the smartphone 500 include a wired or wireless headset, a wired or wireless external battery charger, a wired or wireless data port, a memory card or SIM (Subscriber Identity Module Card)/UIM (User Identity Module Card) card to be connected through a card socket, an external audio and video apparatus to be connected through an audio and video I/O (Input/Output) terminal, an external audio and video apparatus to be connected by wireless, a smartphone to be connected by wire or wirelessly, a personal computer to be connected by wire or wirelessly, a PDA (Personal Digital Assistant) to be connected by wire or wirelessly, a personal computer to be connected by wire or wirelessly, an earphone, and the like. The external input/output unit allows data transferred from such an external apparatus to be transmitted to each constituent element in the interior of the smartphone 500, and allows data in the interior of the smartphone 500 to be transferred to an external apparatus.

The GPS receiving unit 570, in accordance with an instruction of the main control unit 501, receives GPS signals sent from GPS satellites ST1 to STn, executes a positioning operation process based on the multiple GPS signals received, and detects the position of the smartphone 500 by the latitude, longitude and altitude. When the position information can be acquired from the wireless communication unit 510 or the external input/output unit 560 (for example, a wireless LAN (Local Area Network)), the GPS receiving unit 570 can detect the position using the position information.

The motion sensor unit 580 includes, for example, a three-axis acceleration sensor and the like, and detects the physical motion of the smartphone 500 in accordance with an instruction of the main control unit 501. The detection of the physical motion of the smartphone 500 leads to the detection of the moving direction and acceleration of the smartphone 500. This detection result is output to the main control unit 501.

The power unit 590 supplies the electric power stored in a battery (not shown in the figure), to each unit of the smartphone 500, in accordance with an instruction of the main control unit 501.

The main control unit 501, which includes a microprocessor, operates in accordance with the control program and control data stored in the storage unit 550, and integrally controls each unit of the smartphone 500. Further, the main control unit 501 has a mobile communication control function to control each unit of the communication system, and an application processing function, for performing a voice communication and a data communication through the wireless communication unit 510.

The main control unit 501 operates in accordance with the application software stored in the storage unit 550, and thereby, the application processing function is implemented. Examples of the application processing function include an infrared communication function to perform the data communication with a facing apparatus by controlling the external input/output unit 560, an e-mail function to perform the sending and receiving of an e-mail message, a Web browsing function to browse a Web page, and the like.

Further, the main control unit 501 has an image processing function such as the display of a picture to the display/input unit 520, based on image data (still image or moving image data) such as received data or downloaded streaming data. The image processing function is a function by which the main control unit 501 decodes the above image data, performs an image process to the decoded result, and displays the image to the display/input unit 520.

Moreover, the main control unit 501 executes the display control to the display panel 521, and the operation detection control for detecting a user operation through the operation unit 540 or the operation panel 522.

By the execution of the display control, the main control unit 501 displays software keys such as an icon for activating application software and a scroll bar, or displays a window for composing an e-mail message. Here, the scroll bar is a software key for receiving an instruction to move the display part of an image that is too large to fit inside the display region of the display panel 521, or the like.

Further, by the execution of the operation detection control, the main control unit 501 detects a user operation through the operation unit 540, receives an operation to the above icon and an input of a character string to an input box of the above window, or receives a scroll request of the display image through the scroll bar.

Moreover, by the execution of the operation detection control, the main control unit 501 has an operation touch panel control function to decide whether the operation position to the operation panel 522 is the superposition part (display region) overlapping with the display panel 521 or, other than it, the outer edge part (non-display region) not overlapping with the display panel 521, and to control the sensitive region of the operation panel 522 and the display position of the software keys.

Further, the main control unit 501 can detect a gesture operation to the operation panel 522, and can execute a previously set function in response to the detected gesture operation. The gesture operation means not a conventional simple touch operation, but an operation to draw a track from at least one of multiple positions by drawing the track by a finger or the like, by designating multiple positions simultaneously, or by combining them.

The camera unit 541 is a digital camera that performs an electronic image taking using an imaging element such as a CMOS (Complementary Metal Oxide Semiconductor) or a CCD (Charge-Coupled Device). The above-described image pickup device 10 can be applied to the camera unit 541. It is difficult to insert, into the optical system of the smartphone 500, an encoded aperture that is physically disposed in an optical system. Therefore, the above-described image pickup device 10 is suitable for a camera unit that is incorporated in a portable terminal such as the smartphone 500.

Further, by the control of the main control unit 501, the camera unit 541 can convert image data obtained by the imaging, into compressed image data such as JPEG (joint Photographic coding Experts Group), for example, and can record them in the storage unit 550, or output them through the external input/output unit 560 or the wireless communication unit 510. In the smartphone 500 shown in FIG. 11, the camera unit 541 is mounted on the same surface as the display/input unit 520. However, the mount position of the camera unit 541 is not limited to this, and it may be mounted on the back surface of the display/input unit 520. Alternatively, multiple camera units 541 may be mounted. Here, in the case where the multiple camera units 541 are mounted, it is possible to switch a camera unit 541 to be used for an image taking to perform the image taking independently, and to use the multiple camera units 541 simultaneously to perform an image taking.

Further, the camera unit 541 can be utilized for various functions of the smartphone 500. For example, an image acquired by the camera unit 541 can be displayed on the display panel 521, and an image of the camera unit 541 can be utilized as one operation input of the operation panel 522. Further, when the GPS receiving unit 570 detects the position, it can detect the position by referring to an image from the camera unit 541. Moreover, by referring to an image from the camera unit 541, it is possible to decide the optical axis direction of the camera unit 541 of the smartphone 500, and to decide the current usage environment without using a three-axis acceleration sensor or using a three-axis acceleration sensor together. Naturally, it is possible to utilize an image from the camera unit 541 within the application software.

In the embodiments, the example in which a CMOS type imaging element is used as the image sensor has been described. However, without being limited to the CMOS type, other image sensors such as a CCD can be applied.

Further, the present invention is not limited to the above-described embodiments, and, needless to say, various modifications can be made in the range without departing from the spirit of the invention.

What is claimed is:

1. An image-processing device, comprising:
   an image acquiring device configured to acquire an image from an imaging device, the imaging device including a main lens, an image sensor and a lens array, the image sensor including multiple pixels, the multiple pixels being configured by photoelectric conversion elements that are arrayed in a two-dimensional form, the lens array being arranged on an incident plane side of the image sensor, the lens array forming pupil images of the main lens on a light receiving surface of the image sensor, with respective lenses of the lens array, by an amount equal to the number of the lenses of the lens array;
   an encoded aperture pattern setting device configured to set encoded aperture patterns indicating light transmittances of virtual optical filters corresponding to multiple divided areas on a pupil plane of the main lens, respectively;
   a calculation device configured to perform a weighted product-sum calculation between pixel data of pupil images corresponding to the multiple divided areas on the pupil plane of the main lens in the image acquired from the image sensor and the encoded aperture patterns set by the encoded aperture pattern setting device; and
   an image generating device configured to generate an image based on a calculation result by the calculation device.

2. The image-processing device according to claim 1, wherein the encoded aperture pattern setting device comprises a storage device configured to store multiple types of encoded aperture patterns, and a selection device configured to select a single encoded aperture pattern from the storage device, and sets the encoded aperture pattern selected by the selection device.

3. The image-processing device according to claim 1, wherein the encoded aperture pattern setting device comprises a designation device configured to designate a weight coefficient for each position in a two-dimensional filter that has a weight coefficient corresponding to the encoded aperture pattern, and sets an arbitrary encoded aperture pattern based on the designation by the designation device.

4. The image-processing device according to claim 1, wherein the encoded aperture pattern setting device sets a different encoded aperture pattern to the pupil image for each lens of the lens array.

5. An image pickup device comprising the image-processing device according to claim 1.

6. An image-processing device, comprising:
   an image acquiring device configured to acquire an image from an imaging device, the imaging device including a main lens, an image sensor and a lens array, the image sensor including multiple pixels, the multiple pixels being configured by photoelectric conversion elements that are arrayed in a two-dimensional form, the lens array being arranged on an incident plane side of the image sensor, the lens array reforming a picture formed by the main lens, on a light receiving surface of the image sensor;
   a pixel collecting device configured to collect pixels corresponding to an identical position in an object image, from image data of partial images corresponding to multiple divided areas on a pupil plane of the main lens in the image acquired from the image sensor;
   an encoded aperture pattern setting device configured to set encoded aperture patterns indicating light transmittances of virtual optical filters corresponding to the multiple divided areas on the pupil plane of the main lens;
   a calculation device configured to perform a weighted product-sum calculation between the pixels collected by the pixel collecting device and the encoded aperture patterns set by the encoded aperture pattern setting device; and
   an image generating device configured to generate an image based on a calculation result by the calculation device.

7. The image-processing device according to claim 6, wherein the encoded aperture pattern setting device sets a different encoded aperture pattern for each pixel group collected by the pixel collecting device.

8. An image-processing method, comprising:
   an image acquiring step for acquiring an image from an imaging device, the imaging device including a main lens, an image sensor and a lens array, the image sensor including multiple pixels, the multiple pixels being configured by photoelectric conversion elements that are arrayed in a two-dimensional form, the lens array being arranged on an incident plane side of the image sensor, the lens array forming pupil images of the main lens on a light receiving surface of the image sensor, with respective lenses of the lens array, by an amount equal to the number of the lenses of the lens array;

an encoded aperture pattern setting step for setting encoded aperture patterns indicating light transmittances of virtual optical filters corresponding to multiple divided areas on a pupil plane of the main lens, respectively;

a calculation step for performing a weighted product-sum calculation between pixel data of pupil images corresponding to the multiple divided areas on the pupil plane of the main lens in the image acquired from the image sensor and the encoded aperture patterns set by the encoded aperture pattern setting step; and an image generating step for generating an image based on a calculation result by the calculation step.

9. The image-processing method according to claim 8, further comprising:

a step for altering a setting of the encoded aperture pattern in the encoded aperture pattern setting step, wherein the calculation step executes the weighted product-sum calculation using an altered encoded aperture pattern, for a single image acquired by the image acquiring step, whenever the encoded aperture pattern is altered by the encoded aperture pattern setting step, and the image generating step generates the image based on the calculation result by the calculation step, whenever the encoded aperture pattern is altered by the encoded aperture pattern setting step.

10. An image-processing method, comprising:

an image acquiring step for acquiring an image from an imaging device, the imaging device including a main lens, an image sensor and a lens array, the image sensor including multiple pixels, the multiple pixels being configured by photoelectric conversion elements that are arrayed in a two-dimensional form, the lens array being arranged on an incident plane side of the image sensor, the lens array reforming a picture formed by the main lens, on a light receiving surface of the image sensor;

a pixel collecting step for collecting pixels corresponding to an identical position in an object image, from image data of partial images corresponding to multiple divided areas on a pupil plane of the main lens in the image acquired from the image sensor;

an encoded aperture pattern setting step for setting encoded aperture patterns indicating light transmittances of virtual optical filters corresponding to the multiple divided areas on the pupil plane of the main lens;

a calculation step for performing a weighted product-sum calculation between the pixels collected by the pixel collecting step and the encoded aperture patterns set by the encoded aperture pattern setting step; and an image generating step for generating an image based on a calculation result by the calculation step.

* * * * *